(12) United States Patent
Newman

(10) Patent No.: US 10,479,499 B2
(45) Date of Patent: Nov. 19, 2019

(54) SELF-CONTAINED AERIAL CARGO VEHICLE

(71) Applicant: The Boeing Company, Chicago, IL (US)

(72) Inventor: Daniel I. Newman, Lafayette Hill, PA (US)

(73) Assignee: The Boeing Company, Chicago, IL (US)

( * ) Notice: Subject to any disclaimer, the term of this patent is extended or adjusted under 35 U.S.C. 154(b) by 499 days.

(21) Appl. No.: 15/365,414

(22) Filed: Nov. 30, 2016

(65) Prior Publication Data

US 2018/0148168 A1      May 31, 2018

(51) Int. Cl.
| | | |
|---|---|---|
| *B64C 39/02* | (2006.01) | |
| *B64C 27/08* | (2006.01) | |
| *B64D 9/00* | (2006.01) | |
| *B64C 1/30* | (2006.01) | |
| *B64C 27/50* | (2006.01) | |

(52) U.S. Cl.
CPC .............. *B64C 39/024* (2013.01); *B64C 1/30* (2013.01); *B64C 27/08* (2013.01); *B64C 27/50* (2013.01); *B64D 9/003* (2013.01); *B64C 2201/024* (2013.01); *B64C 2201/042* (2013.01); *B64C 2201/108* (2013.01); *B64C 2201/128* (2013.01); *B64C 2201/146* (2013.01); *B64C 2201/201* (2013.01)

(58) Field of Classification Search
CPC ......... B64C 39/024; B64C 1/30; B64C 27/08; B64C 27/50; B64C 2201/024; B64C 2201/042; B64C 2201/108; B64C 2201/128; B64C 2201/146; B64C 2201/201; B64D 9/003
See application file for complete search history.

(56) References Cited

U.S. PATENT DOCUMENTS

| | | |
|---|---|---|
| 2007/0114325 A1 | 5/2007 | Baldwin |
| 2016/0176520 A1 | 6/2016 | Goldstein |

FOREIGN PATENT DOCUMENTS

| | | |
|---|---|---|
| CN | 104260605 A | 1/2015 |
| CN | 205131639 U | 4/2016 |
| CN | 105584621 A | 5/2016 |
| CN | 205574271 U | 9/2016 |

OTHER PUBLICATIONS

Search Report for related European Application No. EP17203694.9; dated Mar. 21, 2018.

*Primary Examiner* — Rodney A Bonnette
(74) *Attorney, Agent, or Firm* — Miller, Matthias & Hull LLP

(57) ABSTRACT

An aerial vehicle includes one or more rotors and a cargo container. The one or more rotors are configured to propel the aerial vehicle. The cargo container defines a cargo volume and is configured to travel with the aerial vehicle during propulsion by the one or more rotors. The cargo container is further configured to contain, at least, the one or more rotors, when the aerial vehicle is not configured for moving cargo.

19 Claims, 11 Drawing Sheets

SELF-CONTAINED AERIAL CARGO VEHICLE

TECHNICAL FIELD

The present disclosure relates generally to aerial vehicles and, more particularly, to aerial vehicles configured for transporting cargo.

BACKGROUND

Aerial vehicles have long been used for the purpose of transporting large shipments of materials, goods, and/or other cargo. Aerial cargo vehicles are able to provide for faster transport of cargo, via the speedier nature of air travel, when compared to other cargo transit techniques, such as transit via road or rail. Additionally, as aerial travel is not constrained by road and/or rail infrastructure, routes planned for aerial cargo transit are often more direct and, therefore, shorter than alternative routes planned for road and/or rail cargo transit.

However, some aerial transit vehicles require the use of large, heavy components needed for one or more stages of takeoff, landing, and/or in-air usage of such vehicles. Accordingly, some aerial transit vehicles may require that certain vehicle components or vehicle-associated components be present at a landing site when the vehicle is scheduled to land at said landing site. Because such components are not onboard the vehicle during transit, potential landing places for a vehicle may be limited.

Further, when aerial vehicles need to be stored, when they are not readied for active transit, aerial vehicles may occupy a large volume of space at a landing or takeoff site and require dedicated, pre-positioned equipment, facilities, and/or provisions, to protect the aerial vehicle during storage and/or movement. The complexity of some vehicles and the large scale cargo capabilities of such machines ensure that such vehicles occupy large volumes of space.

Accordingly, new aerial vehicle approaches, that can eliminate the need for some or all landing site equipment, that expand the number of potential landing sites via the lack of necessitating such equipment, and/or that are configured to occupy less space at a landing site, when not configured for moving cargo, are desired.

SUMMARY

In accordance with one example, an aerial vehicle is disclosed. The aerial vehicle includes one or more rotors and a cargo container. The one or more rotors are configured to propel the aerial vehicle. The cargo container defines a cargo volume and is configured to travel with the aerial vehicle during propulsion by the one or more rotors. The cargo container is further configured to contain, at least, the one or more rotors, when the aerial vehicle is not configured for moving cargo.

In a refinement, the one or more rotors of the aerial vehicle are configured to be collapsible into the cargo container, when the aerial vehicle is not configured moving cargo.

In another refinement, the aerial vehicle further includes a controller configured to control the aerial vehicle for unmanned travel, when the aerial vehicle is configured for moving cargo.

In a further refinement, the controller is configured to receive control commands from a remote operator, the control commands for directing travel of the aerial vehicle, when the aerial vehicle is configured for moving cargo.

In another refinement, the one or more rotors include a plurality of rotor components and a plurality of joints, each of the plurality of joints associated with at least two rotor components, each of the plurality of joints configured to fold at least two rotor components of the one or more rotors and the one or more rotors are configured to be collapsible into the cargo container by folding one or more of the plurality of rotor components, with respect to another of the plurality of rotor components, at each of the plurality of joints.

In yet another refinement, the aerial vehicle further includes at least one of one or more power sources, one or more controllers, one or more actuators, one or more wireless transceivers, one or more batteries, one or more rotor blades, and any combinations thereof, each of the one or more rotors includes at least one of one or more support structures, one or more rotor motors, one or more rotor blades, and any combinations thereof, each of the at least one of one or more power sources, one or more controllers, one or more actuators, one or more wireless transceivers, one or more batteries, one or more rotor blades, and any combinations thereof are configured to be contained by the container, when the aerial vehicle not configured for moving cargo, each of the at least one of the one or more rotors, the one or more support structures of the one or more rotors, the one or more rotor motors of the one or more rotors, the one or more rotor blades of the one or more rotors, and any combinations thereof are configured to be contained by the container, when the aerial vehicle not configured for moving cargo.

In yet another refinement, the cargo container includes a first horizontally disposed wall, a second horizontally disposed wall, and a plurality of vertically disposed walls, the first and second horizontally disposed walls being horizontally disposed substantially perpendicular with respect to the direction of gravity and each of the plurality of vertically disposed walls disposed substantially parallel with the direction of gravity and the one or more rotors are operatively coupled with the first horizontally disposed wall.

In a further refinement, each of the plurality of vertically disposed walls, the first horizontally disposed wall, and the second horizontally disposed wall are configured to combine to form an enclosure having the cargo volume and each of the plurality of vertically disposed walls, the first horizontally disposed wall, and the second horizontally disposed wall are attachable and detachable, with respect to another of the plurality of vertically disposed walls, the first horizontally disposed wall, and the second horizontally disposed wall.

In a further refinement, the one or more rotors are operatively coupled with a first surface of the first horizontally disposed wall and remains operatively coupled with the first surface of the first horizontally disposed wall when the aerial vehicle is configured for moving cargo and when the one or more rotors are contained by the cargo container.

In another further refinement, when the aerial vehicle is configured for moving cargo, the first horizontally disposed wall is a ceiling wall of the cargo container and the first surface of the ceiling wall is an exterior top wall of the cargo container and when the one or more rotors are contained within the cargo container, the first horizontally disposed wall is a floor wall of the cargo container and the first surface of the floor wall is an interior floor wall of the cargo container.

In a further refinement, when the aerial vehicle is configured for moving cargo, the cargo container is configured, for assembly, to substantially maintain the cargo volume, as the one or more rotors propel the aerial vehicle from the top wall of the cargo container.

In another further refinement, when the aerial vehicle is configured for moving cargo, each of the plurality of side walls are reconfigured as repurposed horizontal walls, each of the repurposed horizontal walls substantially perpendicular with the direction of gravity and each of the repurposed horizontal walls and the second horizontal wall are configured to be stacked beneath and substantially parallel with the ceiling wall.

In another refinement, the aerial vehicle further includes an external load lifting connection, the external load lifting connection operatively coupled with the cargo container and configured to lift an external load during travel of the aerial vehicle.

In another refinement, the one or more rotors are a quadrotor configuration for propelling the aerial vehicle.

In another refinement, the one or more rotors are a tandem rotor configuration for propelling the aerial vehicle.

In accordance with another example, a cargo unit configured for shipment of a load is disclosed. The cargo unit includes a cargo container, defining a cargo volume, and an aerial vehicle. The aerial vehicle includes, at least, one or more rotors configured to propel the cargo unit, when the cargo unit is configured for moving cargo. The aerial vehicle is configured to be contained by the cargo container within a portion of the cargo volume, when the cargo unit is not configured for moving cargo.

In a refinement, the aerial vehicle is configured to be collapsible into the cargo container, when the cargo unit is not configured for moving cargo.

In another refinement, the aerial vehicle further includes a controller configured to control the aerial vehicle for unmanned travel, when the aerial vehicle is configured for moving cargo.

In accordance with yet another example, a method for packing an aerial vehicle within an operatively coupled cargo container is disclosed. The cargo container defines a cargo volume and the aerial vehicle includes, at least, one or more rotors, the one or more rotors each including a plurality of rotor components. The method includes folding one or more of the plurality of rotor components, with respect to another of the one or more rotor components and forming, at least in part, the cargo container to define the cargo volume by arranging one or more cargo container walls. The method further includes positioning, once folding of the one or more of the plurality of rotor components has occurred, the one or more rotors within the cargo volume and enclosing the one or more rotors within the cargo volume.

In accordance with yet another example, a method for preparing a cargo unit for moving cargo is disclosed. The cargo container defines a cargo volume and the aerial vehicle includes, at least, one or more rotors, the one or more rotors each including a plurality of rotor components. The method includes deconstructing the cargo container to provide ingress to the cargo volume by displacing one or more of a plurality of cargo container walls of the cargo container, repositioning one or more of the plurality of cargo container walls of the cargo container such that the aerial vehicle is not enclosed by the cargo container, and unfolding one or more rotor components of the one or more rotors, from a folded state.

These and other aspects and features will become more readily apparent upon reading the following detailed description when taken in conjunction with the accompanying drawings. In addition, although various features are disclosed in relation to specific examples, it is understood that the various features may be combined with each other, or used alone, with any of the various examples without departing from the scope of the disclosure.

While the present disclosure is susceptible to various modifications and alternative constructions, certain illustrative examples thereof will be shown and described below in detail. The disclosure is not limited to the specific examples disclosed, but instead includes all modifications, alternative constructions, and equivalents thereof.

DETAILED DESCRIPTION

The proceeding detailed description of the appended drawings illustrate multiple, non-limiting examples of aerial vehicles and/or cargo units that include, or are otherwise associated with, aerial vehicles. Such aerial vehicles disclosed herein include, at least, one or more rotors configured to propel the aerial vehicle, thus allowing the aerial vehicle to travel. The aerial vehicles disclosed herein include, or are otherwise associated with, a cargo container that defines a cargo volume therein. Such cargo containers can be embodied by, for example, joint modular integrated containers (JMIC), twenty-foot equivalent unit (TEU) containers, Conex intermodal containers, MILVAN ("military van") containers, and/or any other cargo containers known in the art.

Such cargo containers are configured to travel with an associated aerial vehicle during propulsion of the aerial vehicle by the one or more rotors. During travel, the cargo container may contain any cargo that is intended to be moved from one destination to another, via the aerial vehicle. However, when the aerial vehicle is not configured for moving cargo, the cargo container is configured to contain, at least, the one or more rotors and, optionally, any additional elements of the aerial vehicle. While the drawings and the associated detailed descriptions thereof, below, appear to illustrate specific elements and/or methods of performing such containment of the aerial vehicle, the examples presented herein are merely exemplary and, certainly, other alternative elements and/or methods for containing the aerial vehicle, or any components thereof, within a cargo container are contemplated.

Reference will now be made in detail to specific examples or features, which are illustrated in the accompanying drawings. Generally, corresponding reference numbers will be used throughout the drawings to refer to the same or corresponding parts.

Figure 1:
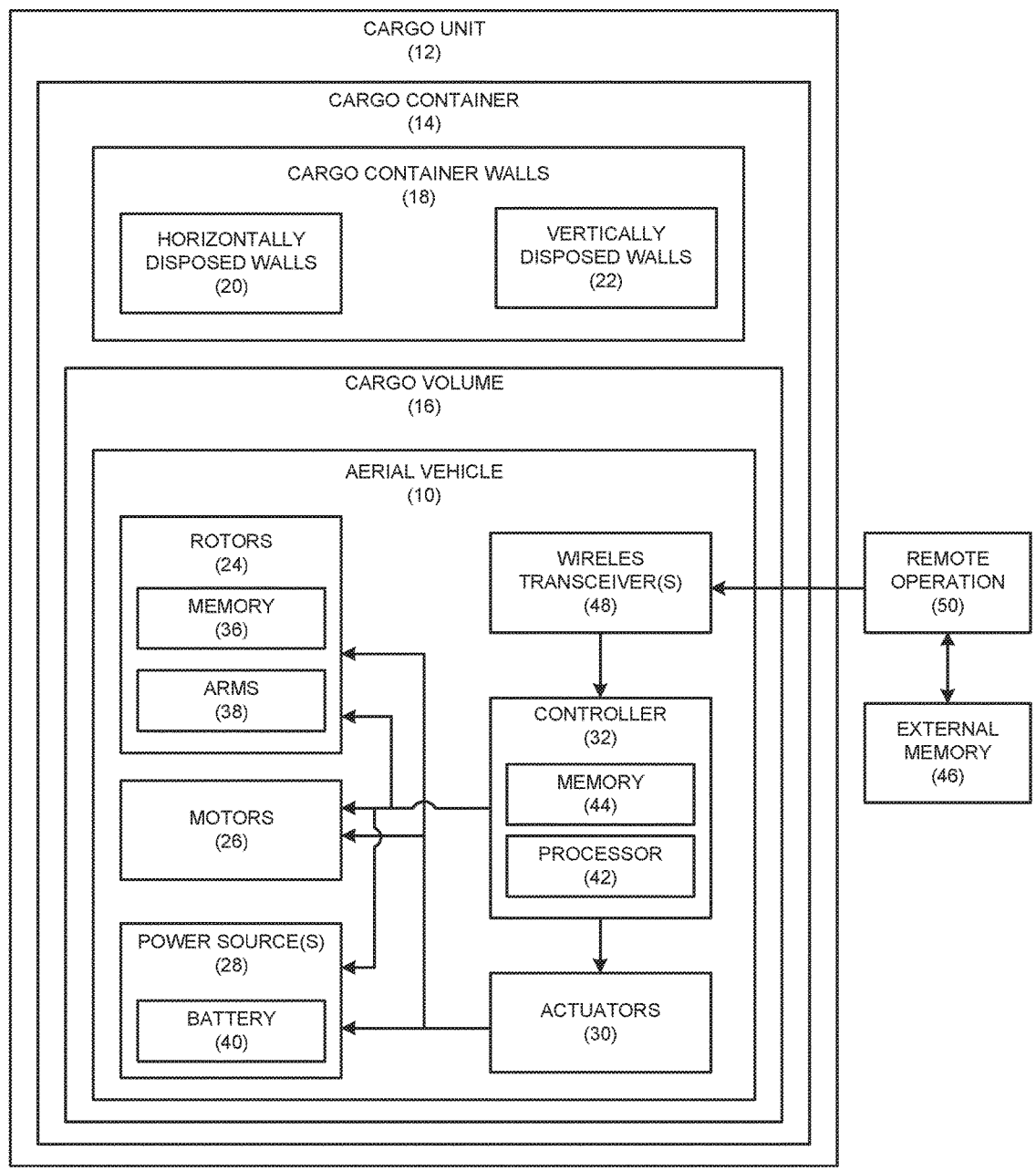
FIG. 1 is a schematic block diagram for an aerial vehicle and an associated cargo unit, in accordance with an embodiment of the disclosure.

FIG. 1 illustrates a schematic block diagram for an aerial vehicle 10 and an associated cargo unit 12. The cargo unit 12 either is or includes a cargo container 14, which defines a cargo volume 16. The cargo volume 16 may be a consistently maintained volume, over time, or the cargo volume 16 may be variable, over time, based on alterations in structure of the cargo unit 12 and/or the cargo container 14 and/or the cargo volume 16 may be variable based on environmental conditions or changes. In some examples, the cargo container 14 includes a plurality of cargo container walls 18. In some such examples, the cargo container walls 18 include one or more horizontally disposed walls 20 and/or one or more vertically disposed walls 22. Of course, as any cargo container walls 18 may be, by nature of the invention, configurable and/or movable, any cargo container wall 18 is able to be a horizontally disposed wall 20 or a vertically disposed wall 22, based on the instantaneous configuration of the cargo container 14.

"Horizontally disposed," as defined herein, refers to disposition of a wall wherein a major plane of a horizontally disposed wall 20 is generally, substantially perpendicular with the direction of gravitational force; however, horizontal disposition does not mean that said major plane is precisely perpendicular, but rather, said horizontal disposition may be any disposition wherein an angle between the direction of gravity and a line on the major plane of the horizontally disposed wall 20 is greater than 45 degrees. Further, "vertically disposed," as defined herein, refers to wall disposition wherein a major plane of a vertically disposed wall 22 is generally, substantially parallel with the direction of gravitational force; however, vertical disposition does not mean that said major plane is precisely parallel, but rather, said vertical disposition may be any disposition wherein an angle between the direction of gravity and a line on the major plane of the horizontally disposed wall 22 is less than 45 degrees.

As described above, the aerial vehicle 10 is configured to be contained by the cargo container 14, when the aerial vehicle 10 is configured for transport and/or storage (e.g., does not move cargo by self-propulsion). Accordingly, any elements of the aerial vehicle 10, in some examples, are to be contained by the cargo container 14 when the aerial vehicle 10 is not configured for moving cargo. Such components may include, but are not limited to including, one or more rotors 24, one or more motors 26, one or more power sources 28, one or more actuators 30, a controller 32, wireless transceiver(s) 48, and/or any additional or alternative components of the aerial vehicle 10. In some examples, the rotors 24 include rotor blades 36 and/or include one or more rotor arms 38, as shown and described in more detail below. Further, the power source(s) 28, for example, may be embodied by any suitable power source for an aerial vehicle 10, such as, but not limited to, a battery 40.

The controller 32 may be any electronic controller or computing system including a processor 42 which performs operations, executes control algorithms, stores data, retrieves data, gathers data, actuates actuators associated with the aerial vehicle 10 and/or performs any other computing or controlling task desired. The controller 32 may be a single controller or may include more than one controller disposed to control various functions and/or features of the aerial vehicle 10. Functionality of the controller 32 may be implemented in hardware and/or software and may rely on one or more data maps relating to the operation of the aerial vehicle 10. To that end, the controller 32 may include internal memory 44 and/or the controller 32 may be otherwise connected to external memory 46, such as a database or server. The internal memory 44 and/or external memory 46 may include, but are not limited to including, one or more of read only memory (ROM), random access memory (RAM), a portable memory, and the like. Such memory media are examples of, or include, nontransitory memory media.

In some examples, the controller 32 is configured to communicate control signals to one or more of the rotors 24, the motors 26, the power source(s) 28, and the actuators 30. Such control signals may be used to direct the noted elements of the aerial vehicle 10 to perform a function or task, such as, but not limited to, propulsion of the aerial vehicle 10.

Propulsion, flight, travel, or any other form of motion performed by the aerial vehicle 10 may be performed in accordance with any manual, autonomous, or semi-autonomous control schemes or methods. In some examples, such control schemes and/or methods are executed by the controller 32; however, any control schemes and/or methods are not limited to being performed by the controller 32. As used herein, the aerial vehicle 10 operating in an autonomous manner operates automatically based upon information provided by the controller 32, without the need for human operator input. Such information, for example, can be received by the wireless transceiver 48, which may receive information from a remote operator 50. The remote operator 50 is any machine or person who provides controls for propulsion, flight, travel, or any other form of motion performed by the aerial vehicle 10. Additionally or alternatively, the controller 32 may provide control information to the aerial vehicle 10 based on instructions stored on the internal memory 44.

Further, when the aerial vehicle 10 operates semi-autonomously, control of the aerial vehicle 10 involves an operator, either within the aerial vehicle 10 or remotely (e.g., the remote operator 50), who performs some tasks or provides some input while other tasks are performed automatically based upon information provided by the controller 32. If the aerial vehicle 10 is operating manually, an operator is controlling all or essentially all of the direction, speed, and manipulating functions of the aerial vehicle 10, whether said operator is on board the aerial vehicle 10 or controlling the aerial vehicle 10 remotely. Accordingly, the aerial vehicle 10 is capable of being controlled autonomously, semi-autonomously, and/or manually whether or not the aerial vehicle 10 is manned or unmanned.

Thusly, in some examples, by utilizing the controller 32, the aerial vehicle 10 is configured for unmanned travel in any autonomous, semi-autonomous, or manual control schemes, when the aerial vehicle 10 is configured for travel by self-propulsion. In some such examples, the controller 32 is configured to receive control commands from the remote operator 50, the control commands being configured for directing travel of the aerial vehicle 10, when the aerial vehicle 10 is configured for moving cargo.

Figure 2:
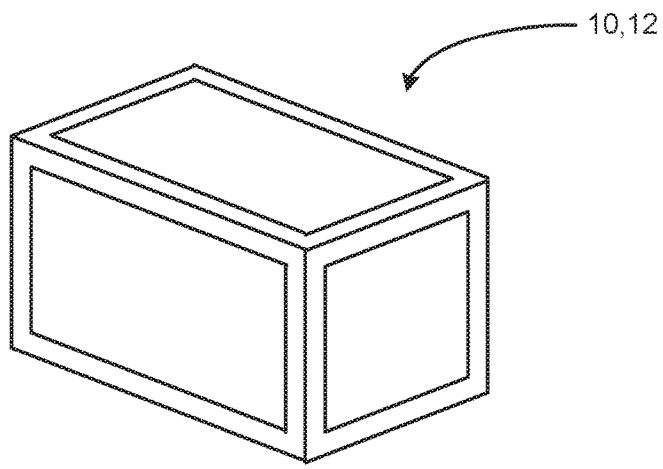
FIG. 2 is a perspective view of an aerial vehicle, not configured for moving cargo, in a packed state, in accordance with an embodiment of the present disclosure.

Turning now to FIGS. 2-14, the aerial vehicle 10 is shown in various states including or in preparation between being in a non-travelling state (e.g., placement, storage, shipment by another machine, etc.) or being in a travelling state, the non-travelling and travelling states referring to "travelling" via propulsion by the aerial vehicle 10. For example, FIG. 2 illustrates the aerial vehicle 10 when it is readied for a non-travelling, non-cargo moving state, whereas FIGS. 11-14 illustrate the aerial vehicle 10 in various states for travelling and/or moving cargo, via propulsion of the aerial vehicle 10. FIGS. 3-10 illustrate the aerial vehicle 10 in various states of preparation for either a non-travelling state or for travel via propulsion of the aerial vehicle 10.

Beginning with FIG. 2, the aerial vehicle 10 and associated cargo unit 12 are shown in a non-travelling, aerial vehicle 10 contained state, which may be desirable for placement of the aerial vehicle 10 and associated cargo unit 12, storage of the aerial vehicle 10 and associated cargo unit 12, shipment, by another machine, of the aerial vehicle 10 and associated cargo unit 12 and/or any other static or dynamic scenario, not involving propulsion by the aerial vehicle 10 itself. As shown, when the aerial vehicle 10 and associated cargo unit 12 are not configured for moving cargo, in some examples, the aerial vehicle 10 and associated cargo unit 12 either are or resemble a cargo shipping container. In some examples, when in this state, the aerial vehicle 10 and associated cargo unit 12 are configured to be embodied as or resemble one of, for example, a JMIC, a TEU container, Conex intermodal containers, MILVAN containers, and/or any other cargo container known in the art.

Because the aerial vehicle 10 is able to be self-contained by the cargo unit 12, landing and/or take off sites for the aerial vehicle 10 and associated cargo unit 12 may not need to have equipment present for handling landing and/or take off. Therefore, landing and/or takeoff sites may not be required to house costly, cumbersome equipment, which would otherwise be necessary for other aerial vehicles and/or cargo containers. Further, the lack of a necessity for housing such equipment may expand the number of available takeoff and/or landing sites that may be used by the aerial vehicle 10 and the associated cargo unit 12, in comparison to the available takeoff and landing sites for other, not self-containing vehicles. Additionally, by self-containing the aerial vehicle 10 within the associated cargo unit 12, when not travelling via the aerial vehicle 10, the aerial vehicle 10 and associated cargo unit 12 may occupy less space during storage and/or shipment, in comparison to other cargo hauling aerial vehicles.

As shown in FIG. 2 and the proceeding FIGS. 3-14, the cargo unit 12 includes the plurality of cargo container walls 18, which include one or more horizontally disposed walls 20 and/or one or more vertically disposed walls 22, depending on the physical state of the cargo unit 12 and/or aerial vehicle 10. Of course, as mentioned above, based on configuration of one or both of the cargo unit 12 and the aerial vehicle 10, the disposition of any of the cargo container walls 18 may change from vertical to horizontal. Specifically in FIG. 2, the cargo container walls 18 are configured, relative to one another, to form the cargo container 14 having the cargo volume 16, in which the aerial vehicle 10 is contained when not configured for travel.

To illustrate an exemplary process for preparing the aerial vehicle 10 and associated cargo unit 12 for travel, FIGS. 3-10 illustrate various intermediate states of the aerial vehicle 10 and associated cargo unit 12, during preparations for travel or non-travel, between the non-travelling state of FIG. 2 and the various travelling states of FIGS. 11-14. The illustrated and described preparation states are certainly non-limiting and are merely exemplary.

Figure 3:
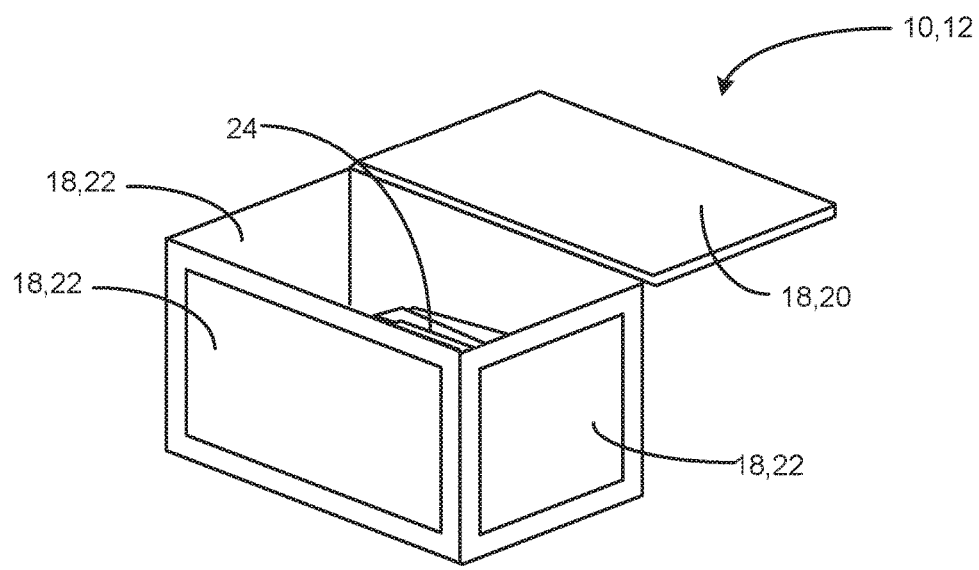
FIG. 3 is a perspective view of the aerial vehicle of FIG. 2, in a first state of unpacking the aerial vehicle from an associated cargo container, in accordance with the embodiment of FIG. 2 and the present disclosure.
Figure 4:
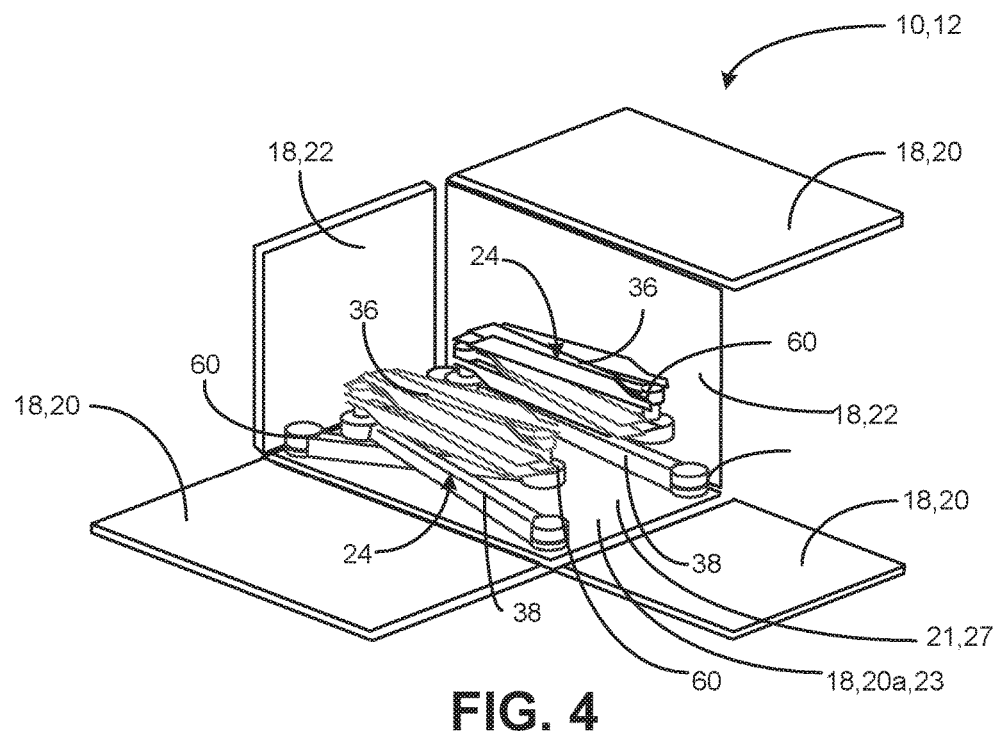
FIG. 4 is a perspective view of the aerial vehicle of FIGS. 2 and 3, in a second state of unpacking the aerial vehicle from the associated cargo container, in accordance with the embodiment of FIGS. 2 and 3 and the present disclosure.
Figure 5:
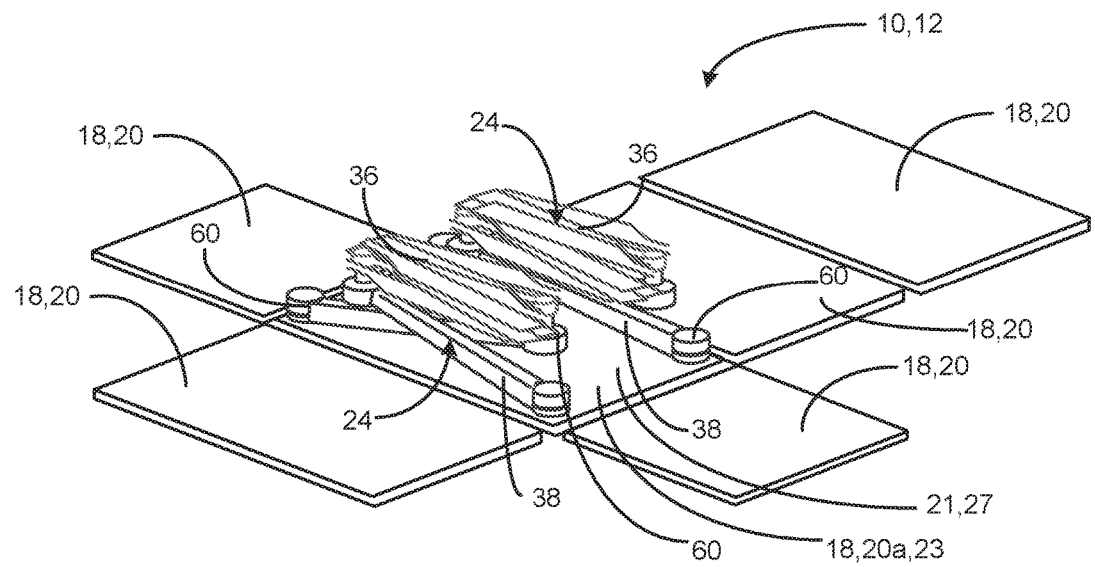
FIG. 5 is a perspective view of the aerial vehicle of FIGS. 2-4, in a third state of unpacking the aerial vehicle from the associated cargo container, in accordance with the embodiment of FIGS. 2-4 and the present disclosure.
Figure 6:
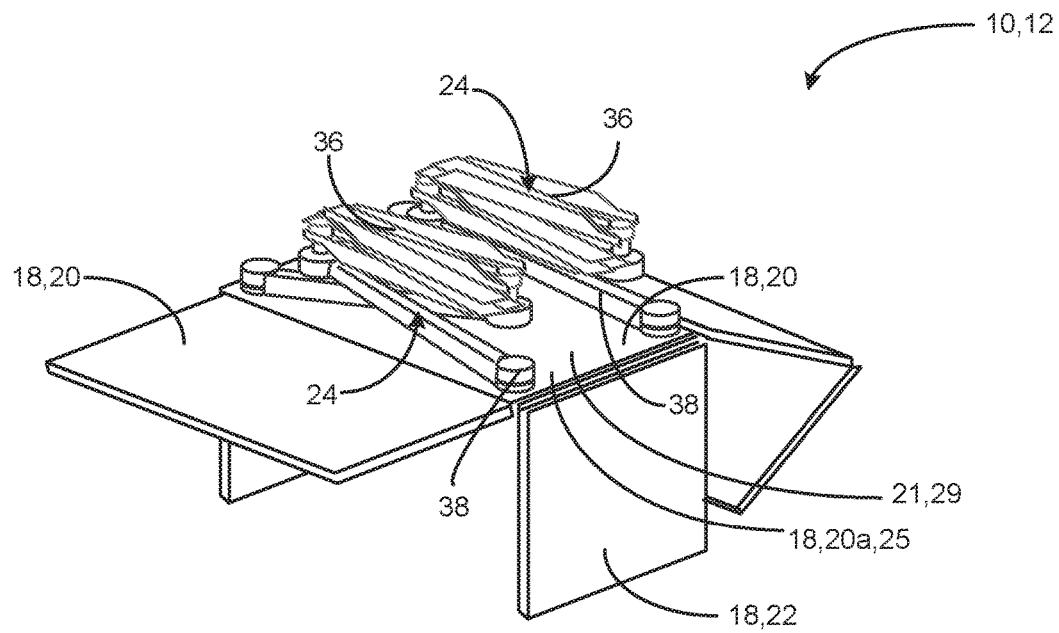
FIG. 6 is a perspective view of the aerial vehicle of FIGS. 2-5, wherein the cargo container is unpacked and walls of the cargo container are in the process of being arranged for moving cargo, in accordance with the embodiment of FIGS. 2-5 and the present disclosure.
Figure 7:
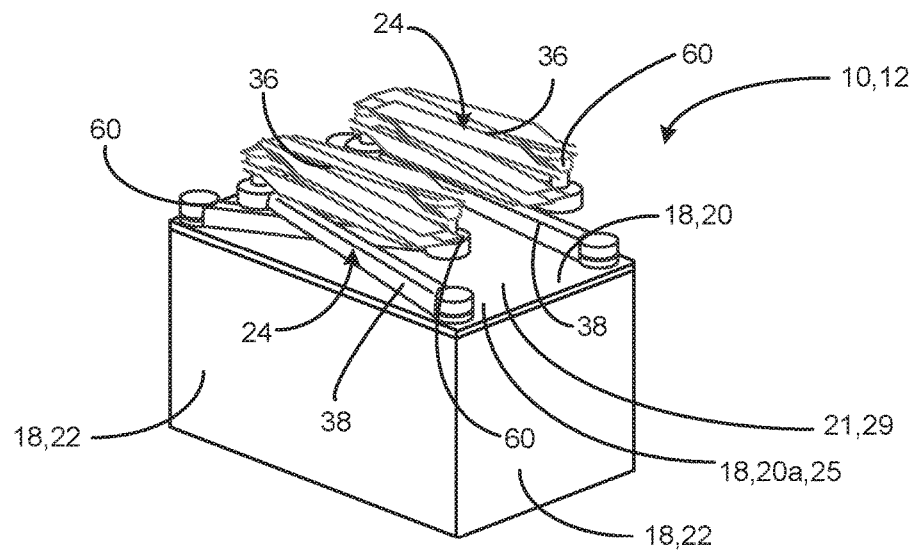
FIG. 7 is a perspective view of the aerial vehicle of FIGS. 2-6, wherein the cargo container is unpacked and the walls of the cargo container are arranged for moving cargo, in accordance with the embodiment of FIGS. 2-6 and the present disclosure.

In FIG. 3, the aerial vehicle 10 and associated cargo unit 12 preparation begins by opening the cargo unit 12 to reveal, at least, the rotors 24 of the aerial vehicle 10. In some examples, the rotors 24 are collapsible into the cargo container 14, in such states wherein the aerial vehicle 10 is not configured for travel. In FIG. 3, for example, the rotors 24 are revealed by removing, folding over, or otherwise moving one of the cargo container walls 18. FIGS. 4 and 5 illustrate further detachment and/or displacement of the cargo container walls 18 to further reveal components of the aerial vehicle 10, such as the rotors 24.

As shown, the rotors 24 include rotor components, such as the one or more rotor blades 36, one or more rotor arms 38, and a plurality of joints 60. The rotor arms 38 may be any structural members, from which the rotors 24 and any components thereof are supported by. The rotor blades 36 may be any blade configured to rotate to generate an aerodynamic lift force to propel the aerial vehicle 10 and associated cargo unit 12. In some examples, each of the joints 60 is associated with two other rotor components (e.g., rotor blades 36, rotor arms 38) and configured to fold the two associated rotor components with respect to one another. In such examples, the rotors 24 are configured to be collapsible into the cargo container 14 by folding the rotor components, with respect to one another, at each of the joints 60. The joints 60 can be any joint, connector, or pivotal attachment point, at which one rotor component is pivotable with respect to another rotor component. Such folding of the rotors 24 is illustrated by FIGS. 7 and 9-11, if one views FIGS. 7 and 9-11 in reverse-sequential order, beginning with FIG. 11, continuing to FIG. 10, then FIG. 9, and ending at FIG. 7, which shows the rotors 24 folded for containment in the cargo container 14. Conversely, unfolding of the rotors 24 is illustrated by viewing FIGS. 7 and 9-11 in sequential order, beginning with FIG. 7, continuing to FIG. 10, then FIG. 10, and ending at FIG. 11, wherein the rotors 24 are unfolded and prepared for travel, in conjunction with the aerial vehicle 10. Of course, as mentioned above, the disclosed aerial vehicle 10 and the systems and/or methods for containing the aerial vehicle 10 components within the cargo container 14, disclosed herein, are non-limiting. In addition to, or as an alternative to, folding components with respect to another, such components may be removed from attachment to other parts, may be stowed with respect to other parts, and may be otherwise rearranged, such that containment within the cargo container 14 is achieved, in any manner.

In some examples and as shown in the drawings, components of the aerial vehicle 10 may be operatively coupled with one or more cargo container wall(s) 18, such that the cargo container 14 becomes convertible relative to the aerial vehicle 10 and/or the one or more cargo container wall(s) 18, with which the aerial vehicle 10 is operatively coupled. This is illustrated in, at least FIGS. 5-7, in which the aerial vehicle 10 and associated cargo unit 12 are shown in various states, in which the partially deconstructed cargo container 14 is to be constructed and/or reconstructed into its configuration for travel with the aerial vehicle 10.

As shown in, at least, FIGS. 4-13, the one or more rotors 24 are operatively coupled with a first surface 21 of a first horizontally disposed wall 20a. In some examples, the one or more rotors 24 are operatively coupled with the first surface 21 of the first horizontally disposed wall 20a by affixing (either permanently, semi-permanently, or detachably), the one or more rotors 24 to the first horizontally disposed wall 20a. When the aerial vehicle 10 is not configured moving cargo (e.g., FIG. 2) or is in various intermediate states between non-travel and travel configurations (e.g., FIGS. 3-5), the first horizontally disposed wall 20a may be a cargo container wall 18 that serves as a floor wall 23 of the cargo container 14, and the first surface 21 is an interior floor 27 to which various vertically disposed walls 22 are affixed. In some additional or alternative examples, when the aerial vehicle 10 is configured for moving cargo (e.g., FIGS. 11-14) or is in various intermediate states between non-travel and travel configurations (e.g., FIGS. 6-10), the first horizontally disposed wall 20a may be a cargo container wall 18 that serves as a ceiling wall 25 of the cargo container 14, and the first surface 21 is an exterior top 29 of the cargo container 14 to which various vertically disposed walls 22 are affixed around. Of course, the configurations of the figures and as described herein are certainly not limiting and any alternative configurations and/or mechanisms for convertible containment of the aerial vehicle 10 are certainly possible.

However, in the examples described above, in some further examples, when the aerial vehicle 10 is configured for moving cargo, the cargo container 14 is configured, via the assembly of the cargo container walls 18, to substantially maintain the cargo volume 16, as the one or more rotors 24 propel the aerial vehicle 10 from their associated location on the ceiling wall 25 of the cargo container 14. "Substantially maintain the cargo volume," as defined herein, means that, in certain travelling configurations, the cargo volume 16 within the cargo container 14 will remain relatively consistent, with allowances for slight changes in volume due to environmental characteristics, wear on the container, or any other modifying force or factor that may depress or expand the cargo volume 16, within reasonable tolerances. In some such examples, the cargo volume 16, when configured for moving cargo, may be substantially similar to the cargo volume 16 when the aerial vehicle 10 and cargo unit 12 are in non-travel configurations. Examples wherein the cargo volume 16 is substantially maintained, when configured for moving cargo, are shown in in FIGS. 9-11, 13, and 14.

Figure 8:
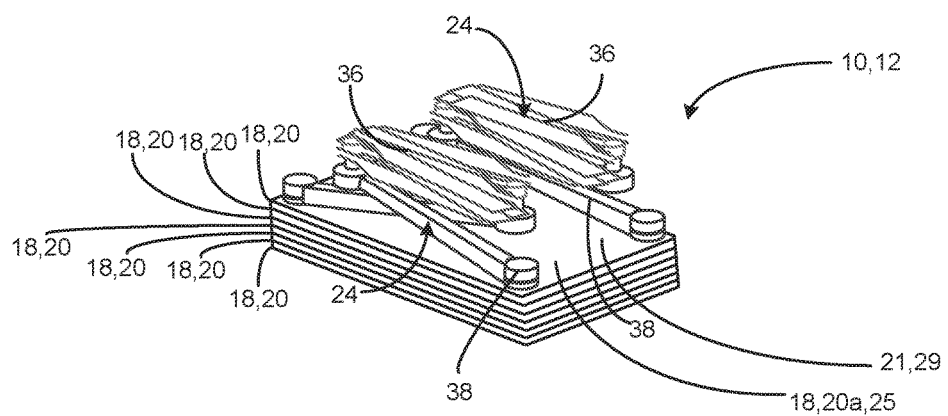
FIG. 8 is a perspective view of the aerial vehicle of FIGS. 2-6, wherein, in contrast to the arrangement of FIG. 7, the walls of the cargo container are arranged as stacked atop each other, in preparation for moving cargo by the aerial vehicle, in accordance with FIGS. 2-6 and the present disclosure.
Figure 9:
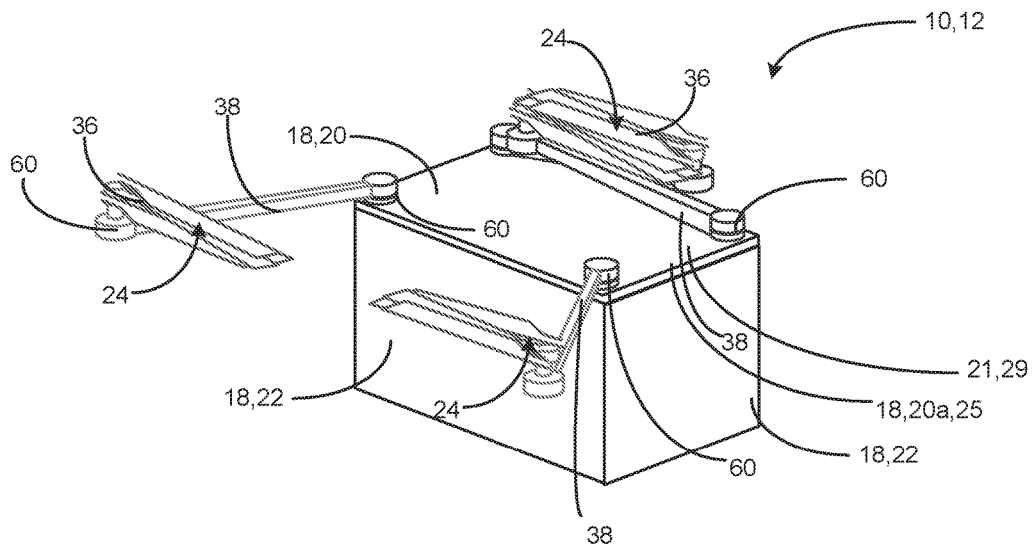
FIG. 9 is a perspective view of the aerial vehicle of FIGS. 2-7, wherein the aerial vehicle is in a first state of travel preparation, wherein components of rotors of the aerial vehicle are unfolded, in accordance with FIGS. 2-7 and the present disclosure.
Figure 10:
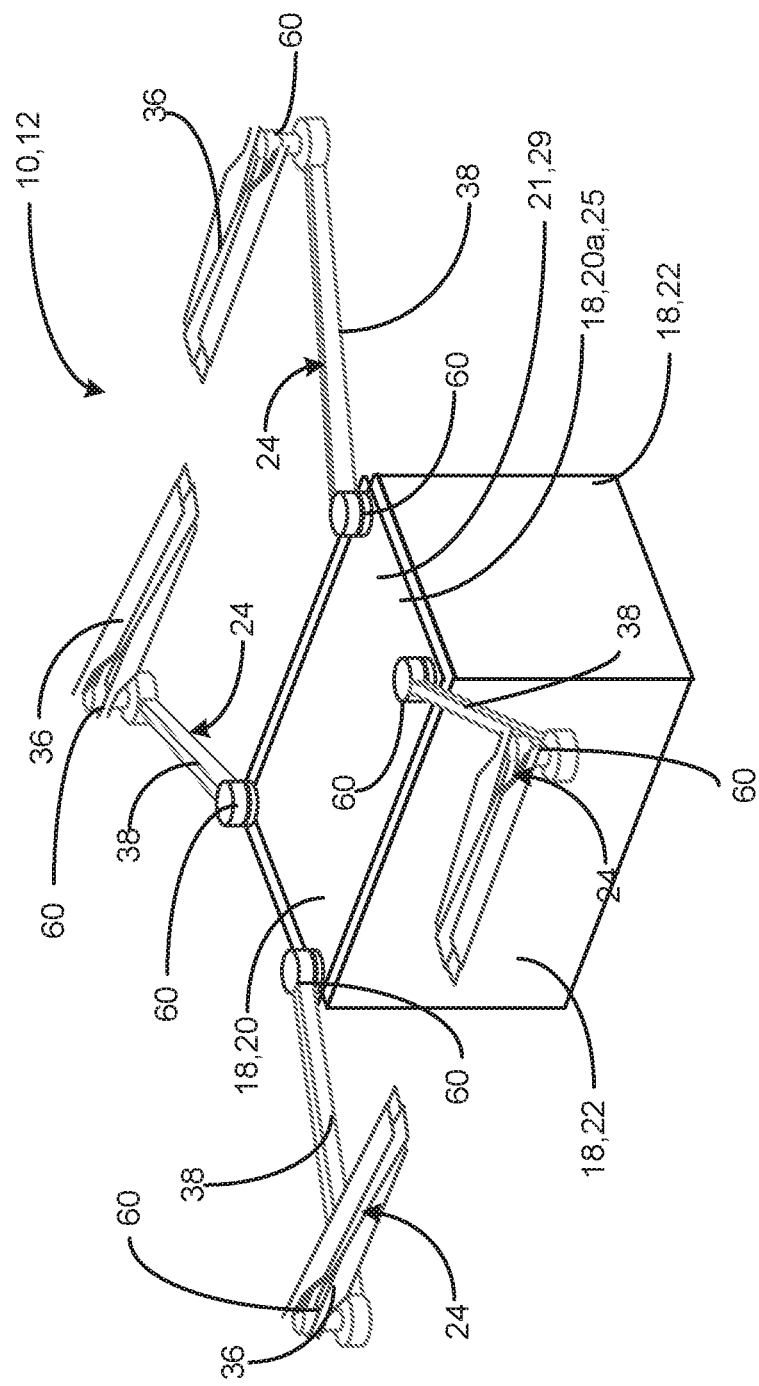
FIG. 10 is a perspective view of the aerial vehicle of FIGS. 2-7 and 9, wherein the aerial vehicle is in a second state of travel preparation, wherein components of rotors of the aerial vehicle are unfolded, in accordance with FIGS. 2-7 and 9 and the present disclosure.
Figure 11:
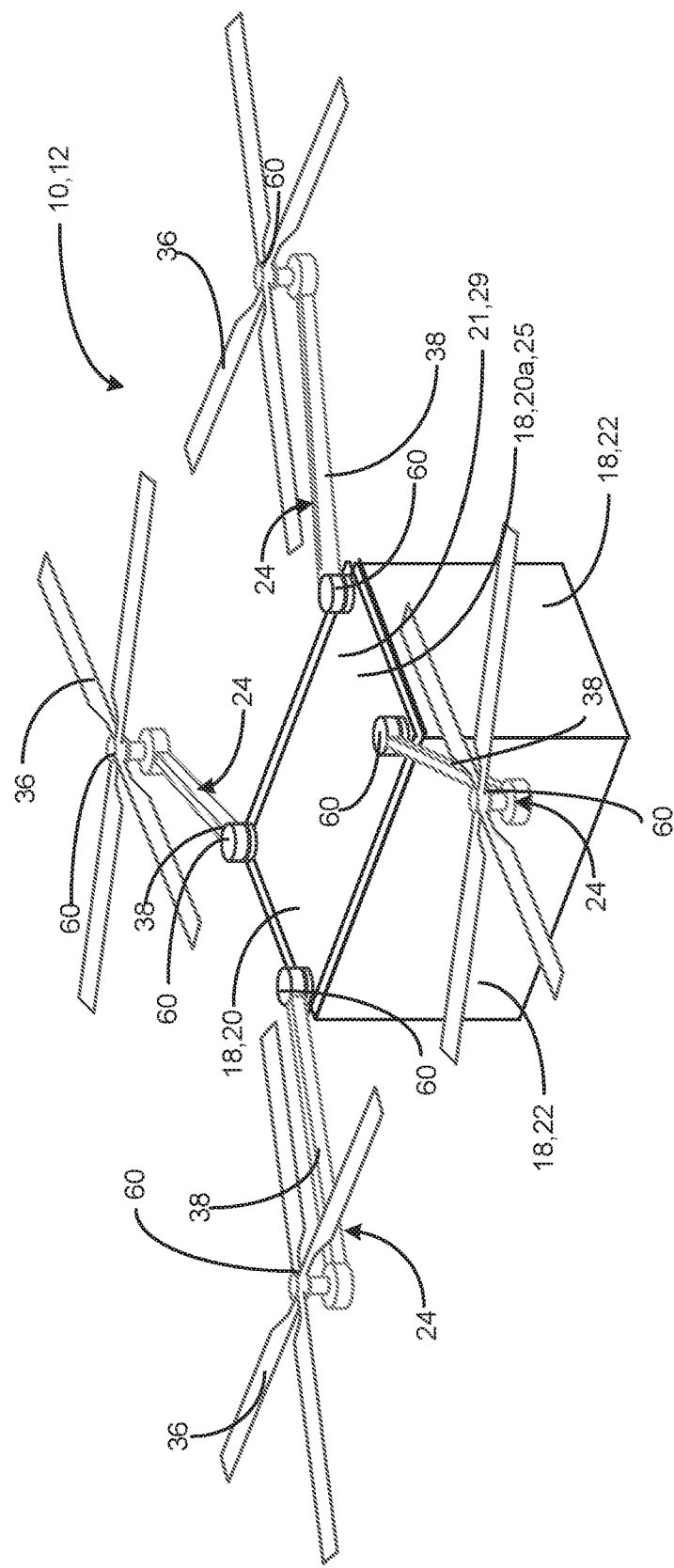
FIG. 11 is a perspective view of the aerial vehicle of FIGS. 2-7, 9, and 10, wherein the aerial vehicle is prepared for moving cargo, in accordance with FIGS. 2-7, 9, and 10 and the present disclosure.
Figure 12:
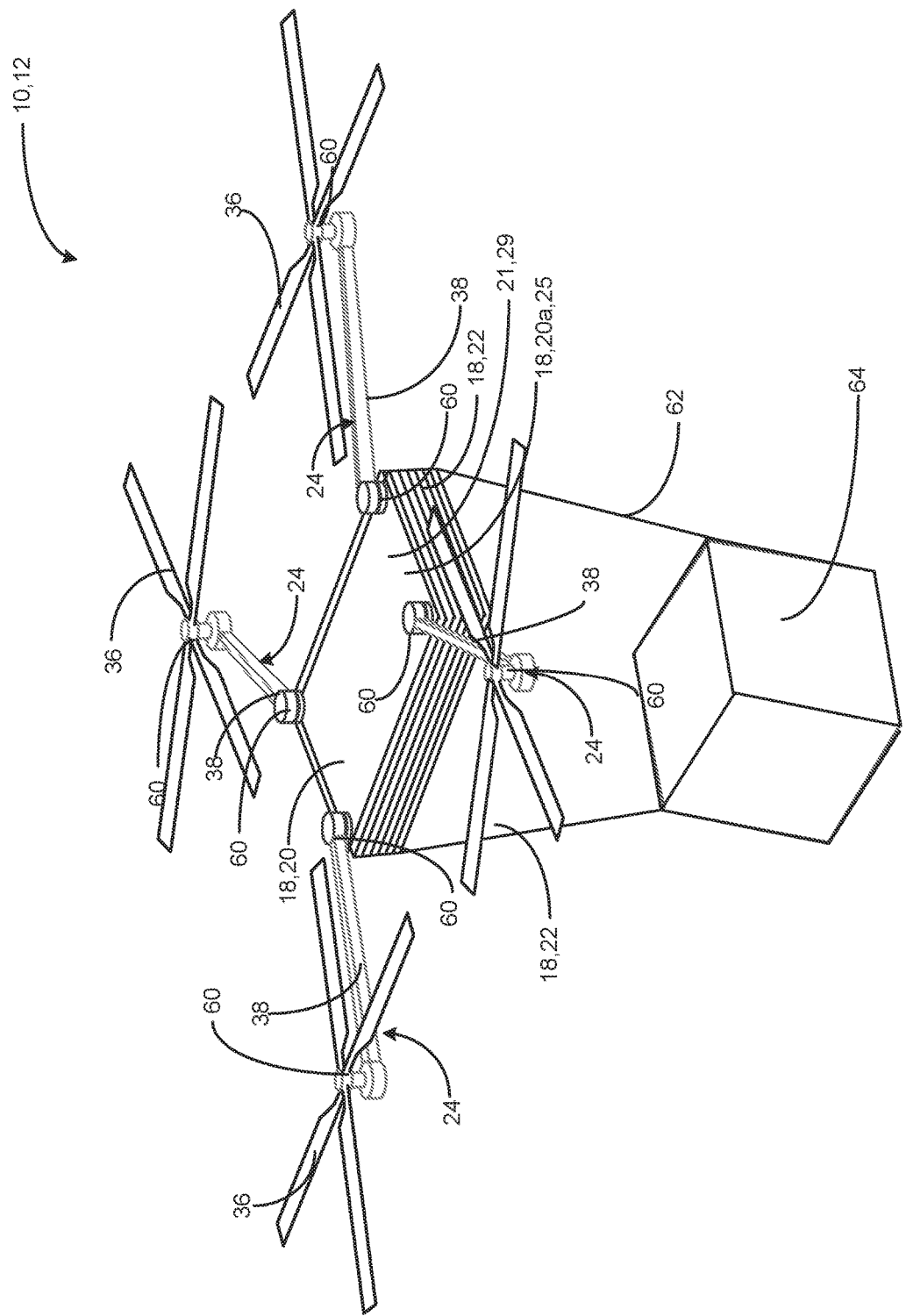
FIG. 12 is a perspective view of the aerial vehicle of FIGS. 2-6 and 8, wherein the aerial vehicle is prepared for moving cargo, in accordance with FIGS. 2-6 and 8 and the present disclosure.
Figure 13:
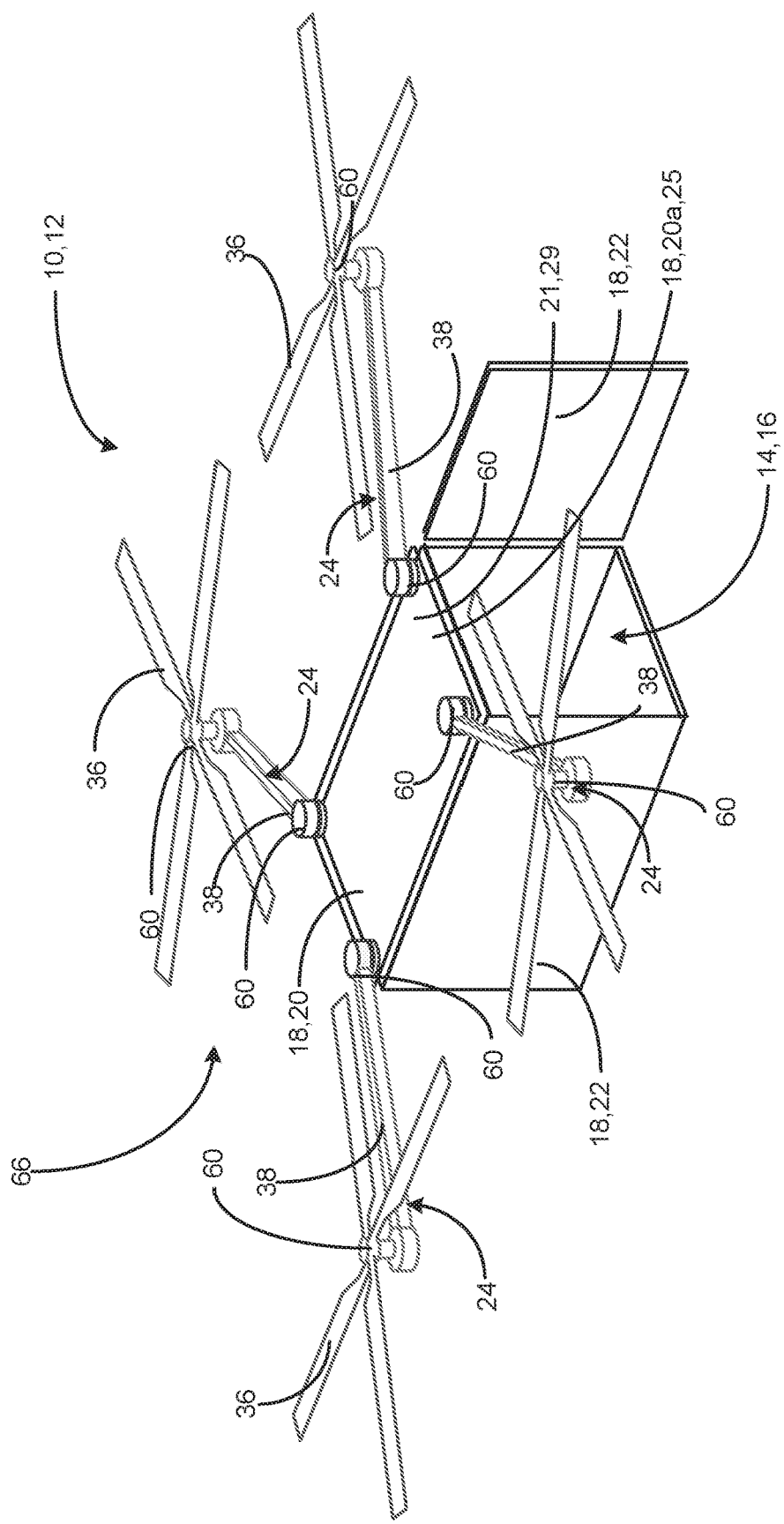
FIG. 13 is a perspective view of the aerial vehicle of FIGS. 2-7 and 9-11, wherein the aerial vehicle is prepared for moving cargo and the cargo unit is opened to accept cargo, in accordance with FIGS. 2-7 and 9-11 and the present disclosure.
Figure 14:
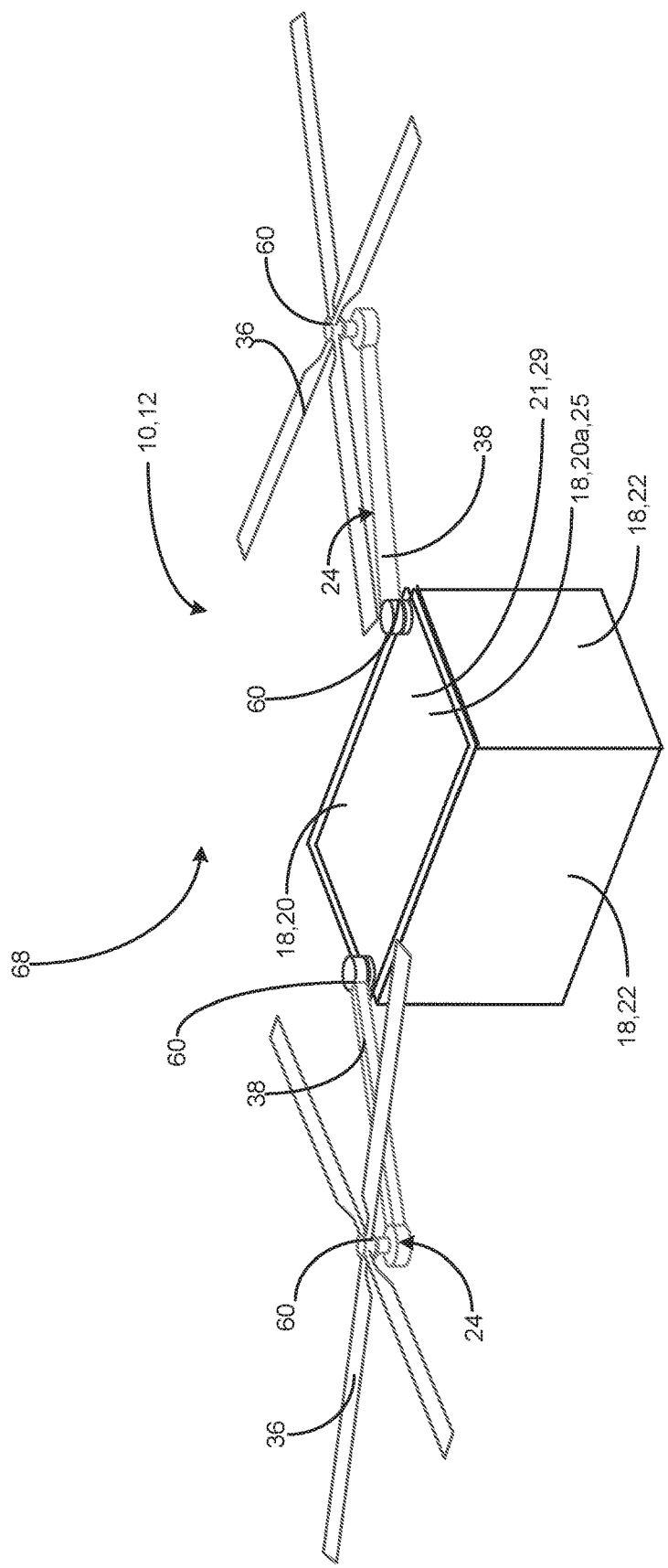
FIG. 14 is a perspective view of another example aerial vehicle having an associated cargo unit, the aerial vehicle configured with a tandem rotor configuration, in accordance with an embodiment of the disclosure.

In some alternative configurations, such as those of FIGS. 8 and 12, the cargo container walls 18 of the cargo container 14 may be configured to not maintain the cargo volume 16, but rather assume a stacked configuration. Particularly shown in FIG. 8, in such a configuration, when the aerial vehicle 10 is configured or is in the process of being configured for moving cargo, each of the vertically disposed walls 22 of the cargo container 14 are repositioned as horizontally disposed walls 20. Then, each of the horizontally disposed walls 20 and any previously horizontally disposed walls 20 are then configured to be and are stacked beneath and substantially parallel with the ceiling wall 25. In such configurations, when the aerial vehicle 10 is not configured for moving cargo, the cargo container walls 18 may be unstacked from the stacked configuration and then reassembled, to reform the cargo container 14, having the cargo volume 16.

As the cargo container 14 may not have a substantial cargo volume 16, when the cargo container walls 18 are in a stacked configuration, the aerial vehicle 10 and/or cargo unit 12 may include or be otherwise associated with an external load lifting connection 62, as shown in FIG. 12. The external load lifting connection 62 may be any mechanism or device (e.g., a pulley system, a rope system, etc.) used to attach an external load 64 to the aerial vehicle 10 and/or the cargo unit 12. Using the external load lifting connection 62, hauling by the aerial vehicle 10 is not limited to only hauling what cargo can fit within the cargo container 14. While the depiction of the external load lifting connection 62 is shown in FIG. 12 as used when the cargo container walls 18 are in a stacked configuration, it is certainly contemplated that the external load lifting connection 62 may be used in configurations wherein the cargo container 14 substantially maintains a cargo volume 16, thereby increasing the cargo hauling capabilities of the aerial vehicle 10 and/or cargo unit 12.

The one or more rotors 24, when configured for moving cargo, may be embodied by any rotor configuration designed to propel the aerial vehicle 10 and the cargo unit 12. Accordingly, the one or more rotors 24 may be arranged in any single rotor configuration or multi-rotor configuration (e.g., a quadrotor configuration, a hexarotor configuration, an octorotor configuration, and the like). For example, as shown in, at least, FIG. 13, the one or more rotors 24 may be configured as a quadrotor configuration 66, which propels the aerial vehicle 10 and/or cargo unit 12. In an alternative example shown in FIG. 14, the one or more rotors 24 may be configured as a tandem rotor configuration 68, which propels the aerial vehicle 10 and/or cargo unit 12. Of course, any available configuration for the one or more rotors 24 which can propel the aerial vehicle 10 and/or cargo unit 12 to move cargo is certainly contemplated.

Figure 15:
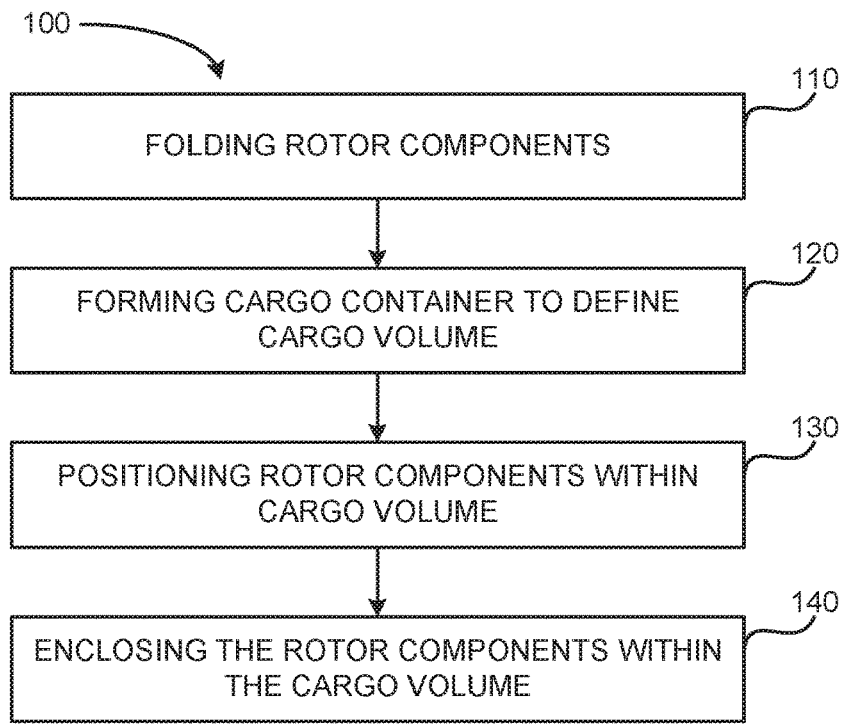
FIG. 15 is an exemplary flowchart for a method for packing an aerial vehicle within an operatively coupled cargo container, in accordance with an embodiment of the disclosure.
Figure 16:
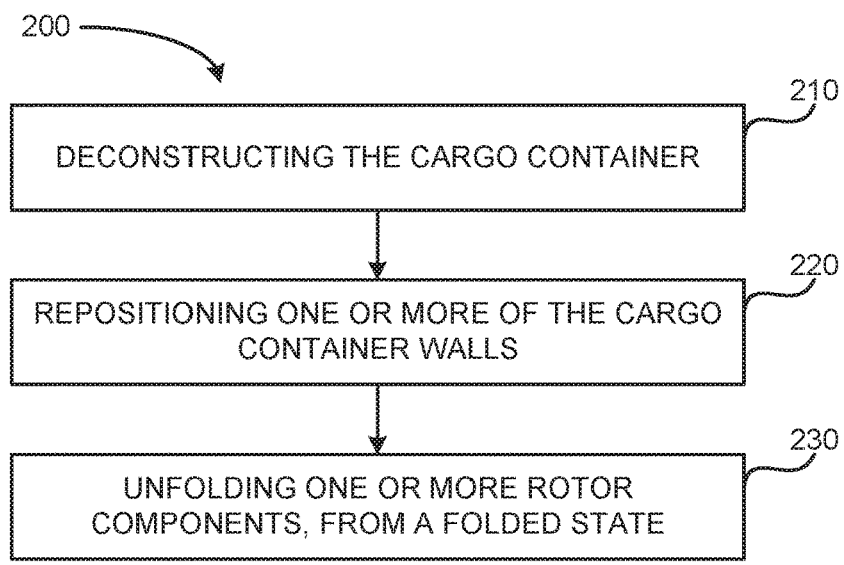
FIG. 16 is an exemplary flowchart for a method for preparing a cargo unit for moving cargo, the cargo unit including a cargo container, defining a cargo volume, in accordance with an embodiment of the disclosure.

Turning now to FIG. 15, an example flowchart for a method 100 for packing an aerial vehicle 10 within an operatively coupled cargo container 14 is illustrated. The method 100 is described, below, with reference to elements of the aerial vehicle 10 and associated cargo unit 12, as described in detail above with reference to FIGS. 1-14. However, the method 100 is certainly not limited to application in conjunction with the aerial vehicle 10 and associated cargo unit 12 and the method 100 is capable of being performed on or using other aerial vehicles and/or cargo units.

The method 100 begins, at block 110, by folding the one or more rotors 24 by, for example, folding one or more rotor components (e.g., rotor blades 36, rotor arms 38, and/or any other rotor components), with respect to another one or more rotor components, as described above and shown in, at least, FIGS. 7-11. Before, concurrently, or after block 110, the method 100 includes forming, at least in part, the cargo container 14 to define the cargo volume 16, by arranging one or more of the cargo container walls 18, as shown in block 120. Arrangements and/or configurations of said cargo container walls 18 are well described above and shown in, at least, FIGS. 3-7.

Once, at least, folding of the rotor components, at block 210 is completed and the cargo volume 16 is, at least in part, formed, at block 120, the method 100 continues to position the one or more rotors 24 within the cargo volume 16, as shown in block 130. With the one or more rotors 24 positioned within the cargo volume 16, the method 100 may complete packing of the aerial vehicle 10 by enclosing the one or more rotors 24 within the cargo volume 16, as shown in block 140.

Further, FIG. 15 illustrates an example flowchart for a method 200 for preparing a cargo unit 12 for travel. The method 200 is described, below, with reference to elements of the aerial vehicle 10 and associated cargo unit 12, as described in detail above with reference to FIGS. 1-14. However, the method 200 is certainly not limited to application in conjunction with the aerial vehicle 10 and associated cargo unit 12 and the method 100 is capable of being performed on or using other aerial vehicles and/or cargo units.

The method 200 beings by deconstructing the cargo container 14 to provide ingress to the cargo volume 16, by displacing one or more of the plurality of cargo container walls 18 of the cargo container 14, as shown in block 210. Such deconstruction is described above and illustrated, in various states of deconstruction, by FIGS. 2-5. With the cargo container 14 broken down, or otherwise deconstructed, at least in part, the method 200 then includes repositioning one or more of the plurality of cargo container walls 18 of the cargo container 14, such that the aerial vehicle 10 is no longer enclosed by the cargo container 14, as depicted in block 220. Such exposure of the aerial vehicle 10, for example, can be embodied by the above-disclosed configuration, in which the aerial vehicle 10 is operatively coupled with the ceiling wall 25 of the cargo container 14. Once the aerial vehicle 10 is no longer enclosed by the cargo container 14, the method 200 includes unfolding the one or more rotor components (e.g., rotor blades 36, rotor arms 38, and/or any other rotor components), from a previously folded state, as depicted in block 230.

What is claimed is:

1. An aerial vehicle comprising:
   one or more rotors configured to propel the aerial vehicle;
   a cargo container comprising a first horizontally disposed wall, a second horizontally disposed wall, and a plurality of vertically disposed walls, each of the plurality of vertically disposed walls, the first horizontally disposed wall, and the second horizontally disposed wall are configured to combine to form an enclosure defining a cargo volume, the cargo container configured to move cargo with the aerial vehicle during propulsion by the one or more rotors and configured to contain, at least, the one or more rotors, when the aerial vehicle is not configured for moving cargo,
   wherein the first horizontally disposed wall is a ceiling wall of the cargo container and a first surface of the ceiling wall is an exterior top wall of the cargo container, and when the one or more rotors are contained within the cargo container, the first horizontally disposed wall is a floor wall of the cargo container and the first surface of the floor wall is an interior floor wall of the cargo container.

2. The aerial vehicle of claim 1, wherein the one or more rotors are configured to be collapsible into the cargo container, when the aerial vehicle is not configured for moving cargo.

3. The aerial vehicle of claim 1, further comprising a controller configured to control the aerial vehicle for unmanned travel, when the aerial vehicle is configured for moving cargo.

4. The aerial vehicle of claim 3, wherein the controller is configured to receive control commands from a remote operator, the control commands for directing travel of the aerial vehicle, when the aerial vehicle is configured for moving cargo.

5. The aerial vehicle of claim 1, wherein the one or more rotors include a plurality of rotor components and a plurality of joints, each of the plurality of joints associated with at least two rotor components, each of the plurality of joints configured to fold at least two rotor components of the one or more rotors, and
   wherein the one or more rotors are configured to be collapsible into the cargo container by folding one or more of the plurality of rotor components, with respect to another of the plurality of rotor components, at each of the plurality of joints.

6. The aerial vehicle of claim 1, further comprising at least one of one or more power sources, one or more controllers, one or more actuators, one or more wireless transceivers, one or more batteries, one or more rotor blades, and any combinations thereof,
   wherein each of the one or more rotors includes at least one of one or more support structures, one or more rotor motors, one or more rotor blades, and any combinations thereof,
   wherein each of the at least one of one or more power sources, one or more controllers, one or more actuators, one or more wireless transceivers, one or more batteries, one or more rotor blades, and any combinations thereof are configured to be contained by the container, when the aerial vehicle is not configured for moving cargo, and
   wherein each of the at least one of the one or more rotors, the one or more support structures of the one or more rotors, the one or more rotor motors of the one or more rotors, the one or more rotor blades of the one or more rotors, and any combinations thereof are configured to be contained by the container, when the aerial vehicle is not configured for moving cargo.

7. The aerial vehicle of claim 1, wherein the first and second horizontally disposed walls are horizontally disposed substantially perpendicular with respect to the direction of gravity and each of the plurality of vertically disposed walls are disposed substantially parallel with the direction of gravity, and
wherein the one or more rotors are operatively coupled with the first horizontally disposed wall.

8. The aerial vehicle of claim 7, wherein each of the plurality of vertically disposed walls, the first horizontally disposed wall, and the second horizontally disposed wall are attachable and detachable, with respect to another of the plurality of vertically disposed walls, the first horizontally disposed wall, and the second horizontally disposed wall.

9. The aerial vehicle of claim 8, wherein the one or more rotors are operatively coupled with a first surface of the first horizontally disposed wall and remains operatively coupled with the first surface of the first horizontally disposed wall when the aerial vehicle is configured for moving cargo and when the one or more rotors are contained by the cargo container.

10. The aerial vehicle of claim 8, wherein, when the aerial vehicle is configured for moving cargo, the cargo container is configured, for assembly, to maintain the cargo volume, as the one or more rotors propel the aerial vehicle from the ceiling wall of the cargo container.

11. The aerial vehicle of claim 8, wherein, when the aerial vehicle is configured for moving cargo, each of the plurality of vertically disposed walls are reconfigured as repurposed horizontal walls, each of the repurposed horizontal walls substantially perpendicular with the direction of gravity, and
wherein each of the repurposed horizontal walls and the second horizontal wall are configured to be stacked beneath and substantially parallel with the ceiling wall.

12. The aerial vehicle of claim 1, further comprising an external load lifting connection, the external load lifting connection operatively coupled with the cargo container and configured to lift an external load during travel of the aerial vehicle.

13. The aerial vehicle of claim 1, wherein the one or more rotors are a quadrotor configuration for propelling the aerial vehicle.

14. The aerial vehicle of claim 1, wherein the one or more rotors are a tandem rotor configuration for propelling the aerial vehicle.

15. A cargo unit configured for aerial travel to transport a cargo load, the cargo unit comprising:
a cargo container comprising a first horizontally disposed wall, a second horizontally disposed wall, and a plurality of vertically disposed walls, each of the plurality of vertically disposed walls, the first horizontally disposed wall, and the second horizontally disposed wall are configured to combine to form an enclosure defining a cargo volume;
an aerial vehicle including, at least, one or more rotors configured to propel the cargo unit, when the cargo unit is configured for moving the cargo load, and the aerial vehicle configured to be contained by the cargo container, when the cargo unit is not configured for moving the cargo load, within a portion of the cargo volume,
wherein the first horizontally disposed wall is a ceiling wall of the cargo container and a first surface of the ceiling wall is an exterior top wall of the cargo container, and when the one or more rotors are contained within the cargo container, the first horizontally disposed wall is a floor wall of the cargo container and the first surface of the floor wall is an interior floor wall of the cargo container.

16. The cargo unit of claim 15, wherein the aerial vehicle is configured to be collapsible into the cargo container, when the cargo unit is not configured for moving the cargo load.

17. The cargo unit of claim 15, wherein the aerial vehicle further includes a controller configured to control the aerial vehicle for unmanned travel, when the aerial vehicle is configured for moving the cargo load.

18. A method for packing an aerial vehicle within an operatively coupled cargo container, the cargo container comprising a first horizontally disposed wall, a second horizontally disposed wall, and a plurality of vertically disposed walls, each of the plurality of vertically disposed walls, the first horizontally disposed wall, and the second horizontally disposed wall are configured to combine to form an enclosure defining a cargo volume and the aerial vehicle including, at least, one or more rotors, the one or more rotors each including a plurality of rotor components, the method comprising:
folding one or more of the plurality of rotor components, with respect to another of the one or more rotor components;
forming, at least in part, the cargo container to define the cargo volume by arranging one or more cargo container walls;
positioning, once folding of the one or more of the plurality of rotor components has occurred, the one or more rotors within the cargo volume; and
enclosing the one or more rotors within the cargo volume,
wherein the first horizontally disposed wall is a ceiling wall of the cargo container and a first surface of the ceiling wall is an exterior top wall of the cargo container, and when the one or more rotors are contained within the cargo container, the first horizontally disposed wall is a floor wall of the cargo container and the first surface of the floor wall is an interior floor wall of the cargo container.

19. A method for preparing a cargo unit for travel, the cargo unit including a cargo container, the cargo container comprising a first horizontally disposed wall, a second horizontally disposed wall, and a plurality of vertically disposed walls, each of the plurality of vertically disposed walls, the first horizontally disposed wall, and the second horizontally disposed wall are configured to combine to form an enclosure defining a cargo volume, and an aerial vehicle, including one or more rotors configured to propel the cargo unit, the method comprising:
deconstructing the cargo container to provide ingress to the cargo volume by displacing one or more of a plurality of cargo container walls of the cargo container;
repositioning one or more of the plurality of cargo container walls of the cargo container such that the aerial vehicle is not enclosed by the cargo container; and
unfolding one or more rotor components of the one or more rotors, from a folded state,
wherein the first horizontally disposed wall is a ceiling wall of the cargo container and a first surface of the ceiling wall is an exterior top wall of the cargo container, and when the one or more rotors are contained within the cargo container, the first horizontally disposed wall is a floor wall of the cargo container and the first surface of the floor wall is an interior floor wall of the cargo container.

* * * * *